(12) United States Patent
Barvosa-Carter et al.

(10) Patent No.: US 7,305,824 B1
(45) Date of Patent: Dec. 11, 2007

(54) POWER-OFF HOLD ELEMENT

(75) Inventors: William Barvosa-Carter, Ventura, CA (US); Cameron Massey, Hawthorne, CA (US)

(73) Assignee: HRL Laboratories, LLC, Malibu, CA (US)

( * ) Notice: Subject to any disclaimer, the term of this patent is extended or adjusted under 35 U.S.C. 154(b) by 123 days.

(21) Appl. No.: 10/913,234

(22) Filed: Aug. 6, 2004

(51) Int. Cl.
*F01B 29/10* (2006.01)

(52) U.S. Cl. .......................... 60/527; 60/528

(58) Field of Classification Search ............... 60/527, 60/528; 24/603; 337/123, 139, 140
See application file for complete search history.

(56) References Cited

U.S. PATENT DOCUMENTS

| | | | | |
|---|---|---|---|---|
| 4,480,733 A * | 11/1984 | Grimm et al. | ............ | 192/223.3 |
| 4,637,944 A | 1/1987 | Walker | ............ | 428/35.1 |
| 4,783,523 A * | 11/1988 | Urry et al. | ............ | 428/373 |
| 4,990,883 A * | 2/1991 | Escobar et al. | ............ | 337/140 |
| 5,079,920 A * | 1/1992 | Whitehead et al. | ............ | 60/527 |
| 5,145,935 A | 9/1992 | Hayashi | ............ | 528/65 |
| 5,189,110 A * | 2/1993 | Ikematu et al. | ............ | 525/314 |
| 5,506,300 A | 4/1996 | Ward et al. | ............ | 525/88 |
| 5,630,671 A | 5/1997 | Larson | ............ | 403/28 |
| 5,665,822 A | 9/1997 | Bitler et al. | ............ | 525/92 C |
| 6,009,166 A * | 12/1999 | Polito et al. | ............ | 379/422 |
| 6,059,815 A * | 5/2000 | Lee et al. | ............ | 606/209 |
| 6,388,043 B1 | 5/2002 | Langer et al. | ............ | 528/80 |
| 6,494,433 B2 | 12/2002 | Mastrangelo et al. | ............ | 251/11 |
| 6,522,953 B1 | 2/2003 | Schneider | ............ | 700/275 |
| 6,603,386 B2 * | 8/2003 | Sood et al. | ............ | 337/140 |
| 6,851,260 B2 * | 2/2005 | Mernøe | ............ | 60/527 |
| 6,872,433 B2 * | 3/2005 | Seward et al. | ............ | 428/36.9 |
| 6,972,659 B2 * | 12/2005 | von Behrens et al. | ............ | 337/139 |
| 7,013,538 B2 * | 3/2006 | Browne et al. | ............ | 24/603 |
| 7,105,117 B2 * | 9/2006 | Rodgers et al. | ............ | 264/173.12 |
| 2003/0127784 A1 | 7/2003 | Davis | ............ | 267/140.14 |
| 2003/0173715 A1 | 9/2003 | Grutta et al. | ............ | 264/450 |
| 2004/0074070 A1 * | 4/2004 | Momoda et al. | ............ | 24/442 |

OTHER PUBLICATIONS

Gordon, R.F., "Applications of Shape Memory Polyurethanes," *Proceedings of the First International Conference on Shape Memory and Superelastic Technologies*, pp. 115-120 (1994).

Kim, B.K., et al., "Polyurethanes Having Shape Memory Effects," *Polymer*, vol. 37, No. 26, pp. 5781-5793 (1996).

Li, F., et al., "Crystallinity and Morphology of Segmented Polyurethanes with Different Soft-Segment Length," *Journal of Applied Polymer Science*, vol. 62, pp. 631-638 (1996).

Takahashi, T., et al., "Structure and Properties of Shape-Memory Polyurethane Block Copolymers," *Journal of Applied Polymer Science*, vol. 60, pp. 1061-1069 (1996).

Tobushi, H., et al., "Thermomechanical Properties of Shape Memory Polymers of Polyurethane Series and their Applications," *J. Physique IV (Colloque C1)*, vol. 6, pp. C1-377-C1-384 (1996).

* cited by examiner

*Primary Examiner*—Hoang Nguyen
(74) *Attorney, Agent, or Firm*—Ladas & Parry

(57) ABSTRACT

A power-off hold element for operating in cooperation with an actuator is disclosed. The power-off hold element comprises a material having selectively adjustable rigidity wherein a position or shape of said material is adjustable when energy is applied to increase the temperature of the material above a temperature where the material becomes flexible and the material is rigid in a position or shape when the temperature of the material decreases below the temperature where the material becomes flexible. Also disclosed is a process for operating a power-off hold element for operating in cooperation with an actuator.

20 Claims, 7 Drawing Sheets

FIG. 3A
FIG. 3B
FIG. 3C
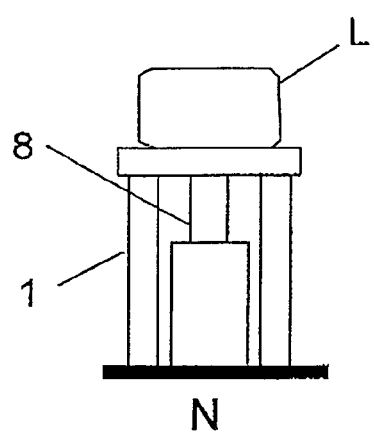
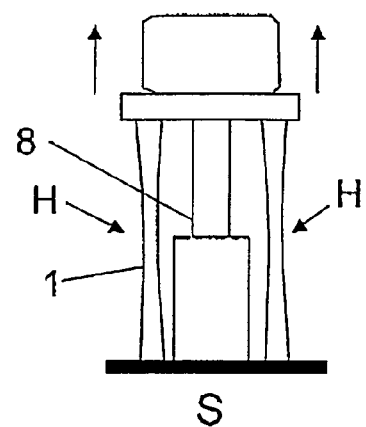
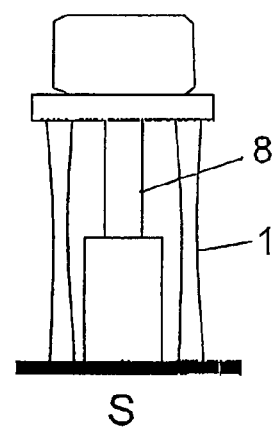
FIG. 3D
FIG. 3E
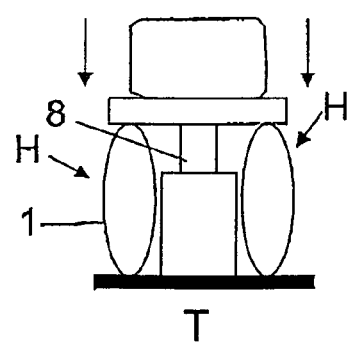
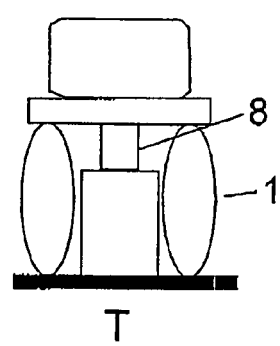

FIG. 4A
FIG. 4B
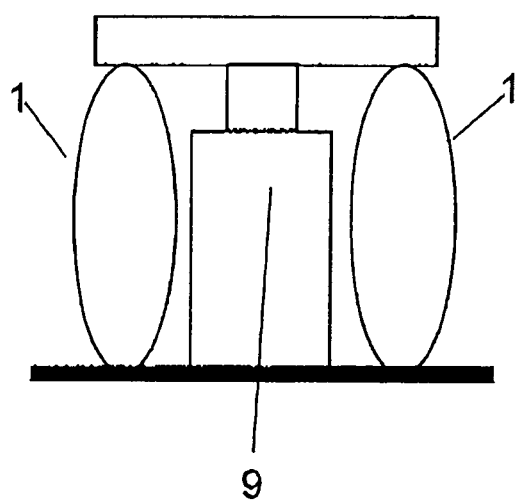
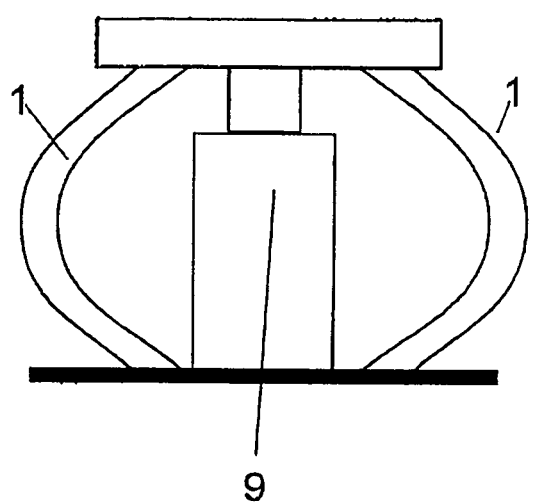

Power-off hold element in a parallel configuration with the actuator control system.

Power-off hold element in a serial configuration with the actuator control system.

POWER-OFF HOLD ELEMENT

BACKGROUND OF THE INVENTION

1. Field of the Invention

This invention is generally in the field of a power-off hold element for operating in cooperation with an actuator and a process for operating a power-off hold element for operating in cooperation with an actuator.

2. Description of Prior Art

U.S. Pat. No. 5,630,671 to Larson, "Locking Device for a Bearing Assembly," which is incorporated herein by reference, discloses a locking device for a bearing assembly, which uses an annular ring that expands and contracts to accept and hold a ball end.

U.S. Pat. No. 4,637,944 to Walker, "Process and Device for Temporarily Holding and Releasing Objects," which is incorporated herein by reference, discloses a process and device for temporarily holding and releasing objects, using the SMP modulus change to hold material.

U.S. Patent Application Publication No. 2003/0127784A1 to Tom S. Davis "Spacecraft Isolator Launch Restraint" which is incorporated herein by reference discloses a spacecraft isolator including shape memory alloy components that are electronically heated to unlock the isolator. The isolator can be manually unlocked with an adjustment bolt.

U.S. Patent Application 2003/0173715A1 to James T. Grutta et al. "Resistive-heated composite structural members and methods and apparatus for making the same" which is incorporated herein by reference discloses a composite structural member, method, and apparatus for making the same. The composite members are formed by resistive heating of the composite material using an electric current with sufficient voltage through the composite. The resistance of the composite material creates an energy loss in the form of heat, melting the matrix of the composite material and allowing the composite material to be shaped in any desired manner.

U.S. Pat. No. 6,388,043 to Langer et al. "Shape Memory Polymers", which is incorporated herein by reference, discloses shape memory polymer compositions, articles of manufacture thereof, and methods of preparation and use thereof. The shape memory polymer compositions can hold more than one shape in memory.

Only a few shape memory polymer systems have been described in the literature (Kim, et al., "Polyurethanes having shape memory effect," Polymer 37(26):5781-93 (1996); Li et al., "Crystallinity and morphology of segmented polyurethanes with different soft-segment length," J. Applied Polymer 62:631-38 (1996); Takahashi et al., "Structure and properties of shape-memory polyurethane block copolymers," J. Applied Polymer Science 60:1061-69 (1996); Tobushi H., et al., "Thermomechanical properties of shape memory polymers of polyurethane series and their applications," J. Physique IV (Colloque C1) 6:377-84 (1996)). These documents are incorporated herein by reference.

Examples of polymers used to prepare hard and soft segments of SMPs include various polyethers, polyacrylates, polyamides, polysiloxanes, polyurethanes, polyether amides, polyurethane/ureas, polyether esters, and urethane/butadiene copolymers. See, for example, U.S. Pat. No. 5,506,300 to Ward et al.; U.S. Pat. No. 5,145,935 to Hayashi; U.S. Pat. No. 5,665,822 to Bitler et al.; and Gorden, "Applications of Shape Memory Polyurethanes,"

U.S. Pat. No. 6,494,433 to Mastrangelo et al. "Thermally activated polymer device" which is incorporated herein by reference discloses microfluidic device adapted for use with a power source.

U.S. Pat. No. 6,522,953 to Schneider "Thermal polymer clamping tool" which is incorporated herein by reference discloses a thermal polymer clamping tool. An electrochemical actuator after initial setup is actuated to melt a polymer, forcing a piston assembly and a bearing to shift the threaded shaft longitudinally against a spring, moving the clamping elements apart a short distance to release or receive a work piece. The electrochemical actuator is then deactivated, allowing the spring to expand, clamping the work piece between the clamping elements with the selected force.

Shape memory is the ability of a material to remember its original shape, either after mechanical deformation, which is a one-way effect, or by cooling and heating, which is a two-way effect. This phenomenon is based on a structural phase transformation.

The first materials known to have these properties were shape memory metal alloys (SMAs), including TiNi (Nitinol), CuZnAl, and FeNiAl alloys. The structure phase transformation of these materials is known as a martensitic transformation.

Proceedings of the First International Conference on Shape Memory and Superelastic Technologies, SMST International Committee, pp. 115-19 (1994) which is incorporated herein by reference. The SMPs that have been developed thus far appear to be limited to being able to hold only one temporary shape in memory. It would be advantageous to provide SMPs that are able to form objects, which are able to hold more than one shape in memory.

Also known in the prior art is a phase change actuator such as a paraffin actuator. This actuator utilizes the elimination of shear strength upon melting and/or thermal expansion of paraffin. This actuator has implicit power-off hold because the paraffin can be solidified in place to hold a given displacement. This actuator has the disadvantage of its speed. The speed relies on heating and cooling of the actuator element itself. What is needed is a material for power-off hold element for operating in cooperation with an actuator.

BRIEF SUMMARY OF THE INVENTION

This invention satisfies the above needs. A new power-off hold element for operating in cooperation with an actuator and a process for operating a power-off hold element for operating in cooperation with an actuator is provided.

One preferred aspect of this invention is a power-off hold element for operating in cooperation with an actuator, the power-off hold element comprises a material having selectively adjustable rigidity. A position or shape of said material is adjustable when energy is applied to increase the temperature of the material above a temperature where the material becomes flexible and the material is rigid in a position or shape when the temperature of the material decreases below the temperature where the material becomes flexible.

Another aspect of this invention is a process for operating a power-off hold element for operating in cooperation with an actuator. The power-off hold element comprises a material having selectively adjustable rigidity. The process comprises:

a) activating the actuator to move;

b) applying energy to the power-off hold element to increase the temperature of the material above a temperature where the material becomes flexible;

b) adjusting a geometry of a structure connected with the material by the actuator;

c) stopping the application of energy to the power-off hold element until the temperature of the material decreases below the temperature where the material becomes flexible and fixing the adjusted geometry connected with the material;

d) stopping the moving of the actuator.

The purpose of this invention is to enable power-off hold to actuators or flexible mechanical structures that currently do not have this capability as an intrinsic feature. Latches, clamps, and other mechanical means are typical methods for accomplishing this goal. There are a number of distinct drawbacks that the proposed invention will alleviate. For instance, there are no moving parts associated with the power-off hold device. An intrinsic property of the material is utilized hence this can greatly impact reliability and survivability. Additionally, many mechanical methods limit the actuator system to several, sometimes only two, power-off positions. In contrast, this invention enables continuous hold positions, greatly enhancing the capabilities of the actuator or mechanism system.

BRIEF DESCRIPTION OF THE SEVERAL VIEWS OF THE DRAWINGS

Aspects and other features of this invention will become better understood with reference to and without limitation by the following description and accompanying drawings where

FIGS. 3A-3E are a front view of an axial type actuator.

FIGS. 4A and 4B are a front view of utilization for the SMP elements with a linear actuator.

DETAILED DESCRIPTION OF THE INVENTION

Figure 1:
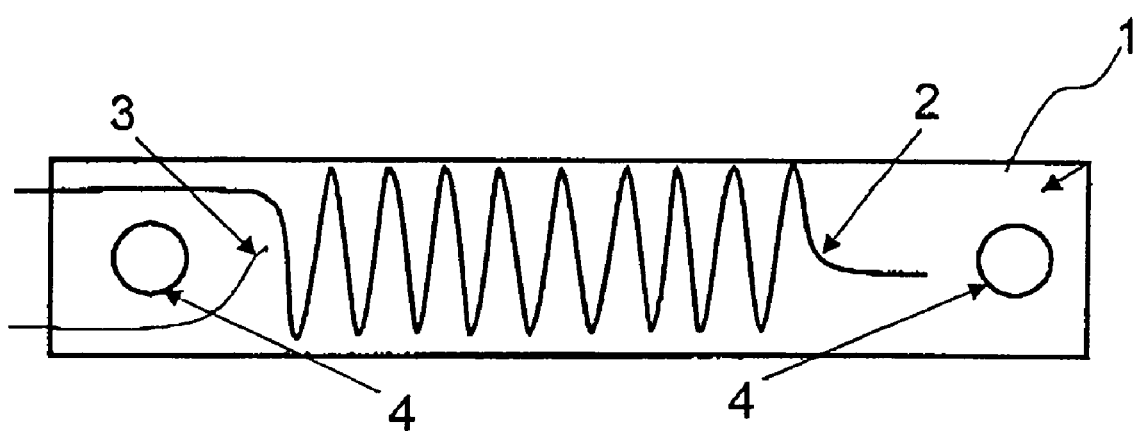
FIG. 1 is a front view of a shape memory Polymer (SMP).

Power-off hold techniques can greatly reduce factors like power, weight, complexity, and cost, while potentially increasing reliability. Additionally, SMP-based power-off hold devices can enable those factors even in hard or demanding environments because of the lack of moving parts. Additionally, SMPs are relatively cheap and light materials that can be formed in a variety of shapes and temperature responses. The primary feature is that SMPs require only heating to activate.

The typical shape memory polymers incorporate "hard" and "soft" segments. The segments preferably are oligomers. As used herein, the term "oligomer" refers to a linear chain molecule having a molecular weight up to 15,000 Daltons. The polymers forming the segments are selected based on the desired glass transition temperature(s) (if at least one segment is amorphous) or the melting point(s) (if at least one segment is crystalline), which in turn is based on the desired applications, taking into consideration the environment of use. Preferably, the Number Average Molecular Weight, Mn of the polymer segment is greater than 400, and is preferably in the range of between 500 and 15,000.

The tensile modulus of the polymers below the $T_{trans}$ is typically between 50 MPa (megapascals) and 2 GPa (gigapascals), whereas the tensile modulus of the polymers above the $T_{trans}$ is typically between 1 and 500 MPa. Preferably, the ratio of elastic modulus above and below the $T_{trans}$ is 20 or more. The higher the ratio, the better is the shape memory of the resulting polymer composition, and the more useful is the SMP in enabling a continuous power-off hold element.

The polymer segments can be natural or synthetic, although synthetic polymers are preferred. The polymer segments can be biodegradable or non-biodegradable, although biodegradable polymer compositions generally are preferred for in vivo medical applications. In general, these materials degrade by hydrolysis, by exposure to water or enzymes under physiological conditions, by surface erosion, by bulk erosion, or a combination thereof. Non-biodegradable polymers used for medical applications preferably do not include aromatic groups, other than those present in naturally occurring amino acids.

Specific applications for SMP based power-off hold devices include but are not limited to:

(i) Lockout of gimbals and vibration sensitive actuators for storage and transportation can be fixed, for example during launch, shipping or payload delivery.

(ii) Damping of sensor packages during high-load/vibration phase of system missions; during the operational phase, said packages can be fixated.

(iii) Lockout/power-off hold of spacecraft deployment and pointing mechanisms.

(iv) Low shock/reusable spacecraft launch locks/latches for deployment mechanisms and actuators.

(v) Lockout of assembly/alignment tooling and positioners. This enhances the use of common tooling in custom applications.

Due to the enhanced applications being demanded of high-performance actuators and high-precision deployment mechanisms there is a need for power-off hold, such as use in space or other challenging environments, and the advent of new types of actuators, such as piezoelectrics, that often have high power or high voltage requirements.

The SMP power-off hold element can either be added later as a distinct element in the control system or incorporated into the design of the actuator. In other words, the power-off hold element can be in cooperation with the actuator control system either utilized in parallel, "dumb" configuration or in series, "smart" configuration.

The basic elements of the power-off hold device according to this invention are depicted in FIG. 1. The main component is the SMP material, which is designed to provide operational flexibility above its transition temperature and stiff hold force below its transition temperature. Also involved are elements such as integrated heating and temperature feedback. Variations of this structure include remote heating, for example heat lamp, proximate heating for example heat bath, and remote temperature sensing, for example IR-radiation.

The basic operation of the power-off hold element is simple. When actuation is desired, the SMP is heated above its glass transition temperature [Tg]. Above Tg the modulus of the SMP decreases dramatically, in essence removing the SMP element from the load path of the mechanism. Hence, the mechanism may be activated without significant hindrance from the SMP element. Once the desired position is reached, the SMP is cooled and frozen in place.

FIG. 1 depicts an example schematic for power-off hold Shape Memory Polymer SMP element 1 (rigidizable element). A flexible internal or external heating element 2

(activating element) enables activation of the element. A thermocouple 3 can allow additional feedback to the control system to indicate when the power-off hold element is activated. Attachment points 4 enable integration with existing mechanisms or actuator systems (not shown).

Figure 2A:
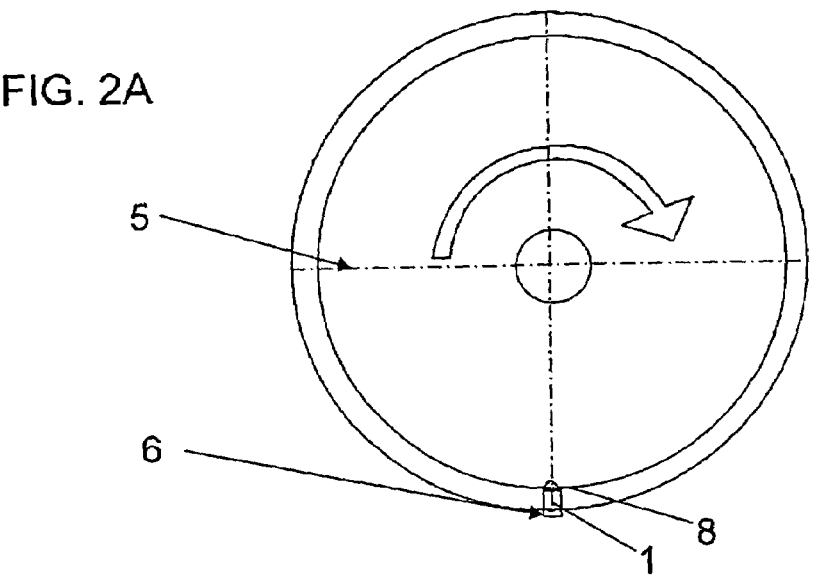
FIGS. 2a and 2b are a front view of an implementation in a latching type scheme for a rotary actuator.
Figure 2B:
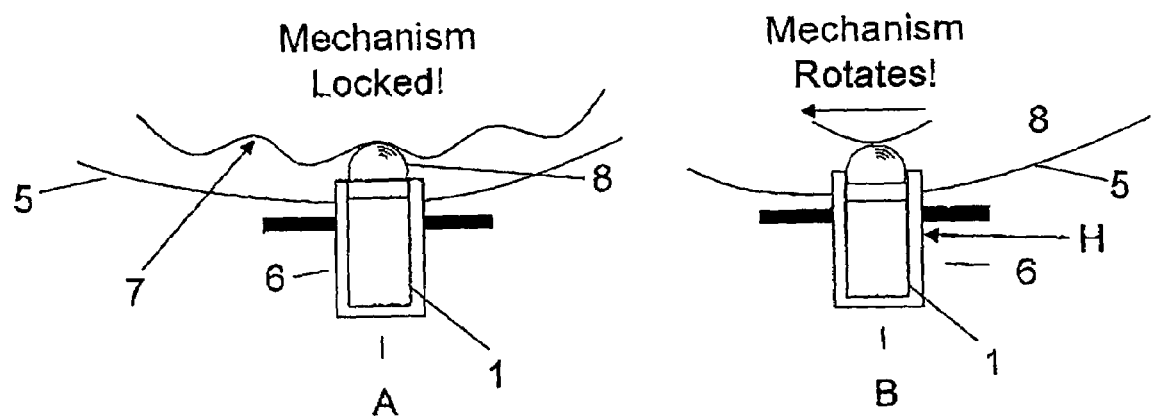
Figure 5A:
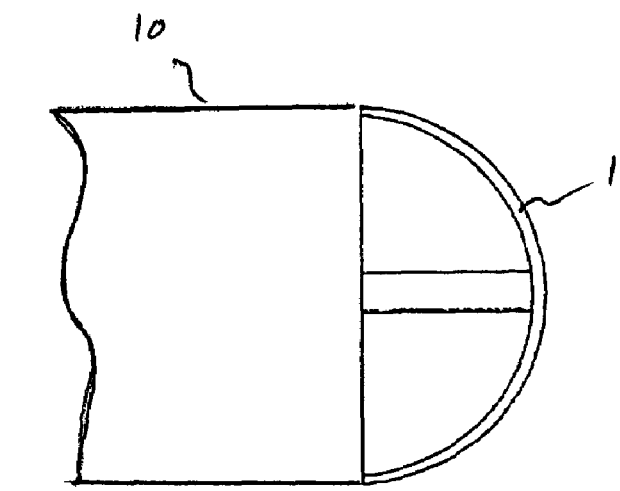
FIGS. 5a-5d are a series of images, from left to right, depicting the front view of an SMP-based power-off hold device in operation.
Figure 5B:
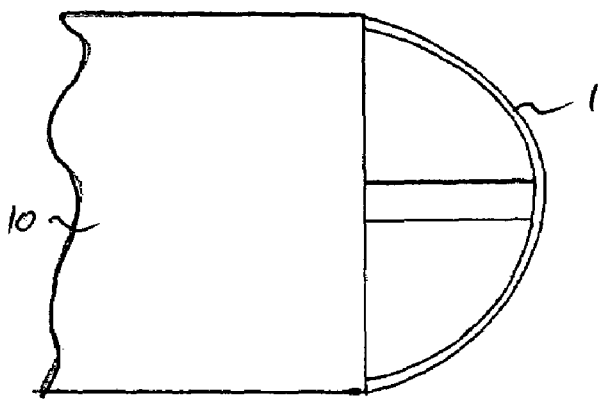
Figure 5C:
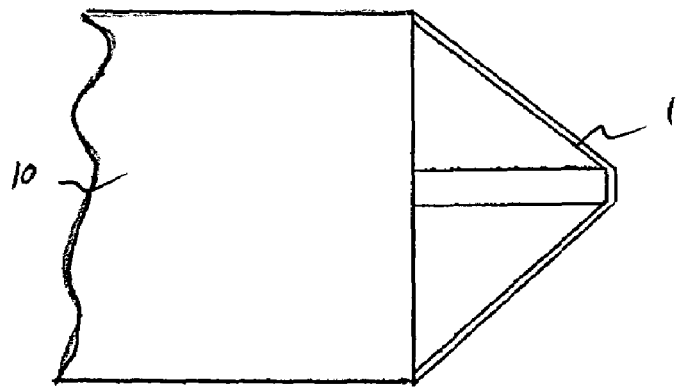
Figure 5D:
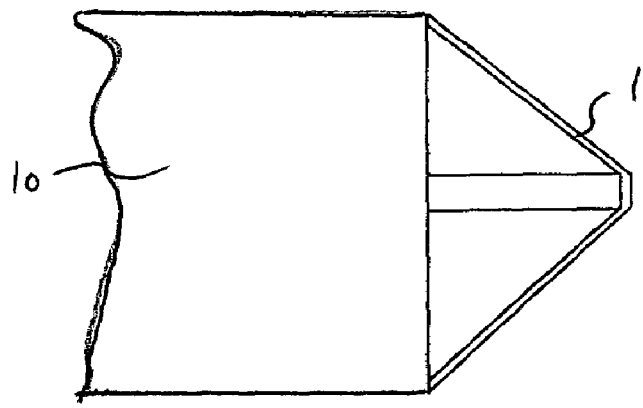

FIG. 2 depicts a specific embodiment showing implementation in a latching type scheme for a rotary actuator or angular mechanism 5. The rotary actuator or angular mechanism 5 is shown in overview in FIG. 2a. FIG. 2b shows Position A and Position B, which are detailed views of the rotary actuator 5 as shown in overview in FIG. 2a at the location locking assembly 6. The locking assembly 6 contains the SMP component 1 and a ball 8 and is situated so as to control the angular motion of the rotary actuator or angular mechanism 5.

FIG. 2 depicts in position A the SMP latch in power-off mode. The SMP component 1 is in the glass phase therefore below the glass transition temperature and locks the ball 8 of the locking assembly 6 against the detent 7. The mechanism is locked in position A.

FIG. 2 depicts in Position B the SMP component 1 when it is heated by a heater H above the glass transition temperature and becomes flexible. The SMP component 1 provides mild spring force but cannot resist the mechanism torque of the angular mechanism 5. The locking assembly 6 no longer locks the ball 8 against the detent 7, since the SMP component is heated above Tg and is flexible. The mechanism 5 is activated and rotates in position B. This example is not limited to rotary mechanisms but can be applied to linear cases as well.

FIG. 3 depicts a specific embodiment dealing with axial type actuators 8 bearing a load L. In this case, a continuous range of power-off hold can be achieved. Variable cross sections can be chosen to enhance stability in extended and/or retracted states as shown in FIGS. 3A-3E.

3A) The actuator 8 and SMP 1 Mechanism are in nominal position N. SMP 1 is hard below the glass temperature of the material. The SMP 1 resists any axial movement of the actuator 8. SMP 1 does not extend as depicted in FIG. 3A.

3B) Heat is applied to the actuator 8 by a heater H. The SMP component 1 is heated above the glass transition temperature of the material, which becomes flexible. The actuator 8 moves axial to secondary position S as depicted in FIG. 3B. The flexible SMP 1 does not resist to the actuator 8. SMP 1 extends when the actuator moves in the axial direction extendedly as depicted in FIG. 3B.

3C) The actuator 8 reaches the secondary position S. The heating of the SMP 1 with the heater H is stopped. The temperature of the SMP component 1 cools below the glass temperature of the material and becomes rigid. The SMP 1 resists any axial movement of the actuator 8 and holds the actuator 8 in the secondary position S. The mechanism is in power-off hold position as depicted in FIG. 3C.

3D) A heating is applied to the actuator 8 by a heater H. The SMP component 1 is heated above the glass temperature of the material and becomes flexible. The actuator 8 moves axial to tertiary position T. The flexible SMP 1 does not resist the actuator 8. SMP 1 retracts when the actuator moves in the axial direction to tertiary position T as depicted in FIG. 3D.

3E) The actuator 8 reaches the tertiary position T. The heating of the SMP component 1 with heater H is stopped. SMP component 1 cools below the glass transition temperature of the material and becomes rigid. The SMP 1 resists any axial movement of the actuator 8 and holds the actuator 8 in the tertiary position T. The mechanism is in power-off hold position as depicted in FIG. 3E.

FIG. 4 depicts two possible modes of utilization for the SMP elements 1 with a linear actuator 9. Position A depicts a stretching mode and position B depicts a bending mode. In the straight/unbuckled configuration as depicted in position A, the SMP component 1 is in the glass phase, therefore below the glass transition temperature and provides an optimum of structural stiffness in intermediate positions A. SMP 1 resists stretching in the glass phase. Alternatively, position B depicts a curved/buckled SMP component 1 in the glass phase. The SMP 1 works as a stiff spring in intermediate positions B.

For a given in-plane cross section, in stretching mode as depicted in position A, the element can bear significantly more weight than in bending mode as depicted in position B. However, bending mode as depicted in position B may be easier to implement, and may be less subject to fatigue of the SMP material 1.

FIG. 5 depicts an exemplary embodiment of the power-off hold capabilities of the SMP element 1. Depicted is a series of images 5a to 5d taken during an operation utilizing the bending strength of the SMP strip 1, as depicted in FIG. 4. A SMP strip 1 is used in cooperation with a conventional solenoid 10, and is heated externally with a heat gun, not shown in the images 5a-5d. A similar embodiment was made using heater wire wrapped around the SMP strip 1 as shown in FIG. 1. The solenoid 10 is operated in the following steps 5a-5d as follows:

(a) The initial unpowered state for the solenoid 10 and SMP 1 elements. The SMP 1 is unheated and therefore below the glass transition temperature. SMP 1 is stiff and hard.

(b) The solenoid 10 is now actuated while the SMP 1 is below the glass transition temperature and rigid. The SMP element 1, which is stiff and hard can almost entirely block the force of the solenoid 10.

(c) The SMP 1 is heated above the glass transition temperature and becomes flexible. The solenoid 10 is actuated. When the SMP 1 is heated above the glass temperature, the SMP strip 1 can bend easily and allow free movement of the solenoid 10 shaft. The spring force of the SMP 1 in the rubbery state, above the glass transition temperature, provides a restoring force allowing two-way axial motion of the solenoid 10.

(d) The heating of SMP 1 is stopped and the temperature of SMP 1 drops below the glass transition temperature. The SMP 1 becomes rigid and stiff and is quenched to the cold, power-off hold state. To maintain the displacement, the SMP 1 is quickly cooled while the solenoid 10 is powered.

Figure 6:
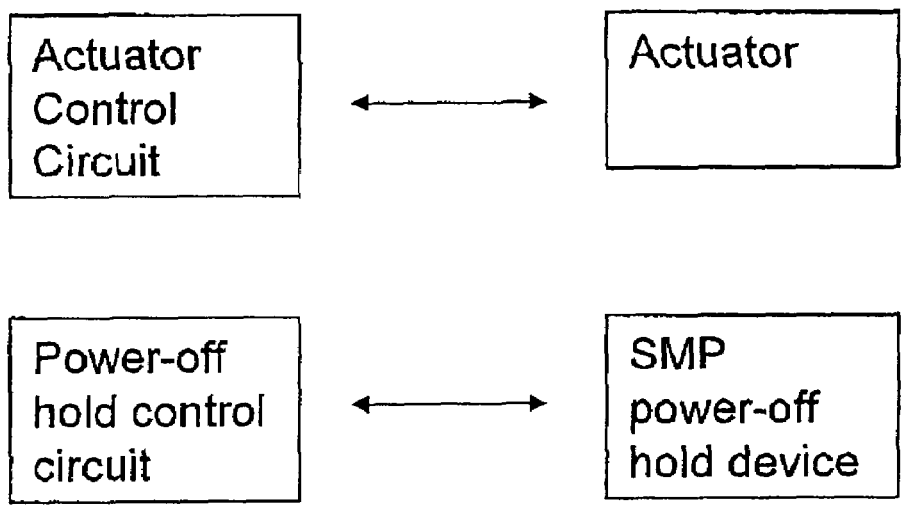
FIG. 6 shows a flow chart of a power-off hold element in cooperation with the actuator control system.

FIG. 6 depicts a flow chart of a power-off hold element in a parallel configuration with the actuator control system. In the parallel configuration the actuator control circuit interacts with the actuator and in cooperation to that the power-off hold circuit interacts with the SMP power-off hold device. In this situation the user or control system must operate the SMP power-off hold device in cooperation with the actuator or mechanism. Activation or use of the mechanism can still be attempted without activating the SMP device.

Figure 7:
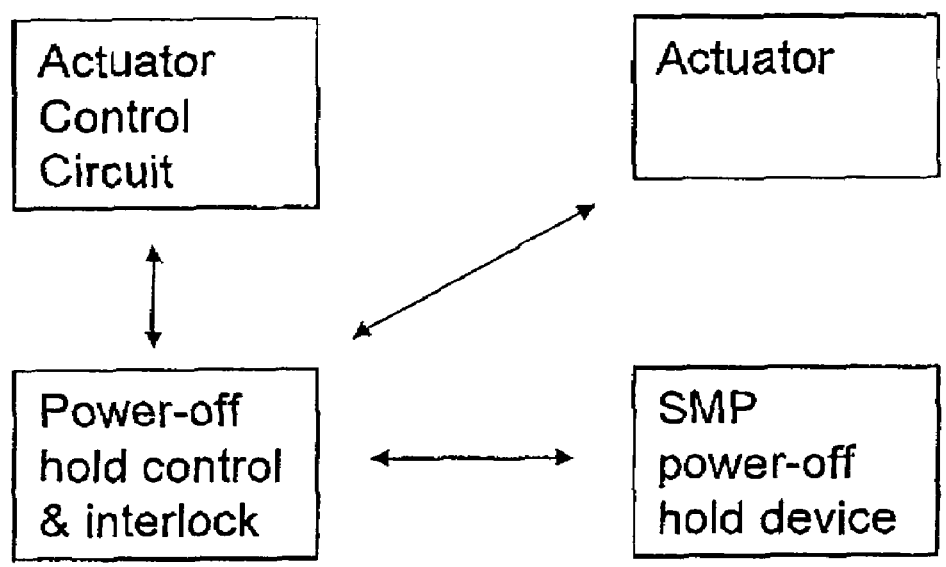
FIG. 7 shows a flow chart of a power-off hold element in a serial configuration with the actuator control system.

FIG. 7 depicts a flow chart of a power-off hold element in a serial configuration with the actuator control system. In the serial configuration the actuator control circuit interacts with the power-off hold control and interlock. The power-off hold control and interlock interacts with the SMP power-off hold device and the actuator. Hence, control or use of the actuator or mechanism is predicated on activation of the SMP power-off hold device.

Let it be understood that the foregoing description is only illustrative of the invention. Various alternatives and modifications can be devised by those skilled in the art without departing from the spirit of the invention. Accordingly, this invention is intended to embrace all such alternatives, modifications, and variances which fall within the scope of the appended claims.

The invention claimed is:

1. A power-off hold element for operating in cooperation with an actuator having a mobile part, wherein the power-off hold element comprises:
   a material having selectively adjustable rigidity and a memorized shape; and
   a structure connected with the material and having an adjustable geometry;
   the structure and the material being arranged such that:
   when energy is applied to increase the temperature of the material above a temperature where the material becomes flexible, the structure allows the mobile part of the actuator to follow a motion that adjusts the geometry of the structure by deforming the material away from its memorized shape, and
   when the temperature of the material decreases below the temperature where the material becomes flexible, the structure prevents the mobile part of the actuator from moving; wherein the actuator is operable independently from temperature.

2. The power-off hold element according to claim 1 wherein the material comprises at least two shapes in memory.

3. The power-off hold element according to claim 1 wherein the material comprises a shape memory polymer.

4. The power-off hold element according to claim 1 wherein the material comprises a thermoplastic polymer.

5. The power-off hold element according to claim 4 wherein the polymer comprises multiple segments, and the 5 molecular weight of at least one of the segments is between about 500 and 10,000.

6. The power-off hold element according to claim 1 wherein the temperature of the material where the material becomes flexible is the glass transition temperature [Tg] of the material.

7. An actuator power-off hold element comprising:
   an actuator having a mobile part;
   a material having selectively adjustable rigidity and a memorized shape; and
   a structure connected with the material and having an adjustable geometry;
   the actuator, the structure and the material being arranged such that:
   when energy is applied to increase the temperature of the material above a temperature where the material becomes flexible, the structure allows the mobile part of the actuator to follow a motion that adjusts the geometry of the structure by deforming the material away from its memorized shape, and
   when the temperature of the material decreases below the temperature where the material becomes flexible, the structure prevents the mobile part of the actuator from moving; wherein the actuator is operable independently from temperature.

8. The actuator according to claim 7, selected from the group consisting of solenoids, electric motors, electromagnetic and/or electrostatic actuators, high performance actuators based on piezoelectrics, magnetostrictives electroactive polymers, ionic polymer metal composites, ionic polymer gels, and shape memory alloys.

9. The actuator according to claim 7, wherein in a rotary actuator
   a) the material locks a ball of a locking assembly against a detent, when the temperature of the material is below the temperature where the material becomes flexible and,
   b) the material does not resist the mechanism torque when the material is heated above a temperature where the material becomes flexible.

10. The actuator according to claim 7, wherein in an axial type actuator
    a) the actuator mechanism is in normal position at a temperature below glass transition temperature of the material,
    b) a heater for heating the material above glass transition temperature of the material is applied, the actuator moves to secondary position,
    c) the heater stops heating the material, the temperature of the material decreases below the glass transition temperature of the material, and the actuator mechanism is in no-power hold,
    d) the heater for heating the material above glass transition temperature of the material is applied, the actuator moves to tertiary position,
    e) the heater stops heating the material, the temperature of the material decreases below the glass transition temperature of the material, actuator mechanism is in no-power hold.

11. A Process for operating a power-off hold element for operating in cooperation with an actuator, wherein said power-off hold element comprises a material having selectively adjustable rigidity comprising:
    a) activating the actuator to move;
    b) applying energy to the power-off hold element to increase the temperature of the material above a temperature where the material becomes flexible;
    c) adjusting a geometry of a structure connected with the material by the motion of the actuator;
    d) stopping applying of energy to the power-off hold element until the temperature of the material decreases below the temperature where the material becomes flexible and fixing the adjusted geometry connected with the material, so as to block the motion of the actuator;
    e) stopping the activating of the actuator.

12. The process according to claim 11 wherein the material is adjustable in at least two shapes in memory.

13. The process according to claim 11 wherein the material comprises a shape memory polymer.

14. The process according to claim 11 wherein the material comprises a thermoplastic polymer.

15. The process according to claim 13 wherein the polymer comprises multiple segments, and the molecular weight of at least one of the segments is between about 500 and 10,000.

16. The process according to claim 11 wherein the temperature of the material where the material becomes flexible is the glass transition temperature [Tg] of the material.

17. A process according to claim 11 wherein a rotary actuator comprises the steps
    a) locking a ball of a locking assembly against a detent by the material, when the temperature of the material is below the temperature where the material becomes flexible and, heating the material above a temperature where the material becomes flexible and does not resist the mechanism torque.

18. The process according to claim 11 wherein in an axial type actuator
 a) the actuator mechanism is in normal position,
 b) the actuator is activated and moves to a secondary position and the material is heated above a temperature where the material becomes flexible,
 c) the actuator mechanism is in no-power hold position when the temperature of the material decreases below a temperature where the material becomes flexible,
 d) the actuator is activated and moves to a tertiary position and the material is heated above a temperature where the material becomes flexible,
 e) the actuator mechanism is in no-power hold position when the temperature of the material decreases below a temperature where the material becomes flexible.

19. A power off hold element according to claim 1, wherein at a temperature above the temperature where the material becomes flexible, the actuator is capable of adjusting said geometry along a two-way motion.

20. An actuator according to claim 7, wherein at a temperature above the temperature where the material becomes flexible, the actuator is capable of adjusting said geometry along a two-way motion.

* * * * *